United States Patent
Choi et al.

(10) Patent No.: US 6,699,409 B2
(45) Date of Patent: Mar. 2, 2004

(54) METHOD FOR PRODUCING DOT-PRINTLESS LIGHT GUIDE PLATE FOR LIQUID CRYSTAL DISPLAY DEVICE USING NORBORNENE COPOLYMER

(75) Inventors: Jin Sung Choi, Daejun-Shi (KR); Jae Geun Park, Daejun-Shi (KR); Bong Seok Moon, Daejun-Shi (KR); Keun Byoung Yoon, Daejun-Shi (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 52 days.

(21) Appl. No.: 09/966,098

(22) Filed: Oct. 1, 2001

(65) Prior Publication Data
US 2002/0132880 A1 Sep. 19, 2002

(30) Foreign Application Priority Data

Jan. 15, 2001 (KR) .............................. 2001-2243
Jun. 12, 2001 (KR) ......................... 2001-32749

(51) Int. Cl.$^7$ ................................. B29D 11/00
(52) U.S. Cl. ....................................... 264/1.24
(58) Field of Search ................. 264/1.24, 1.1, 264/328.1

(56) References Cited

U.S. PATENT DOCUMENTS

| 5,881,201 A | 3/1999 | Khanarian |
| 5,883,163 A | 3/1999 | Hosonuma |
| 6,123,431 A | 9/2000 | Teragaki et al. |

FOREIGN PATENT DOCUMENTS

| JP | A57128383 | 8/1982 |
| JP | 2-276816 | * 11/1990 |
| JP | A10265530 | 10/1998 |

\* cited by examiner

Primary Examiner—Mathieu D. Vargot
(74) Attorney, Agent, or Firm—Birch, Stewart, Kolasch & Birch, LLP

(57) ABSTRACT

The present invention discloses A method for producing a dot-printless light guide plate for a liquid crystal display device using an addition polymerized norbornene copolymer represented by the following general formula (1):

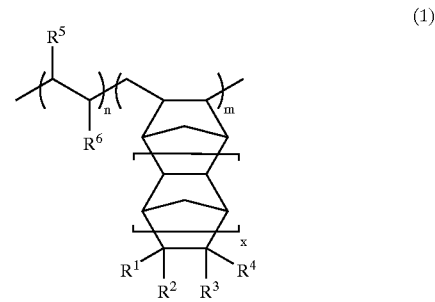

wherein $R^1$, $R^2$, $R^3$ and $R^4$ are respectively a hydrogen atom, a $C_1$~$C_{10}$ linear, branched or cyclic alkyl group, or —$COOR^7$ in which $R^7$ is a $C_1$~$C_{10}$ linear, branched or cyclic alkyl group; $R^5$ and $R^6$ are respectively a hydrogen atom or a $C_1$~$C_{10}$ linear, branched or cyclic alkyl group; and x is an integer of 0 to 4.

7 Claims, 3 Drawing Sheets

METHOD FOR PRODUCING DOT-PRINTLESS LIGHT GUIDE PLATE FOR LIQUID CRYSTAL DISPLAY DEVICE USING NORBORNENE COPOLYMER

BACKGROUND OF THE INVENTION

Priority Korean Patent Application Nos. 2001-2243 filed on Jan. 15, 2001 and 2001-32749 filed on Jun. 12, 2001, are incorporated herein in their entirety by reference.

FIELD OF THE INVENTION

The invention relates to a method for producing a dot-printless light guide plate for a liquid crystal display device, and more particularly a method for producing a dot-printless light guide plate for a liquid crystal display device in which the dot-printless light guide plate is made of addition polymers consisting of norbornene-based monomer and olefin-based monomer. The addition polymers used on the present invention have a good transmission rate of light between 400 nm to 800 nm of frequency and do not have a double bond in their chemical structures so that yellowness does not occur. The polymers also have an advantage that their melt flow rate and heat resistance can be controlled to a desirable degree by changing substituents of ethylene and norbornene. Therefore, they are excellent in moldability for a dot-printless light guide plate and coating composition containing cesium compound or silicon compound can be readily applied to them. Further, the light guide plate made of the polymers has a good bending resistance due to its low hygroscopicity.

DESCRIPTION OF THE RELATED ART

Back lighting for liquid crystal display devices commonly used can be divided into two types. One is a side-light type in which a cold cathode florescent tube is disposed in the lateral side of a light guide plate and the other is a multi-lamp type in which two or four lamps are disposed in the lateral side of by a light guide plate in order to enhance luminance of a back lighting apparatus.

The light guide plate according to the present invention is for using as a component of the back lighting apparatus of the side-light type. An illuminating device of the side-light type is disclosed in Japanese Patent Laid-Open Publication No. 57-128383. This illuminating device has a structure in which a light source such as a cold cathode gas discharge tube, a hot cathode gas discharge tube, a light bulb or LED is disposed on the lateral side of a light emission surface. The light sources can be adapted in various shapes, for example, L-shape, U-shape, W-shape, etc., depending on their use to be applied. In the illuminating device, the light emitted from a light source is introduced into a light guide plate through a lateral side of the light guide plate, and transferred via a light diffusion plate and a polarizing plate into observing part by changing it's advancing direction using a light scattering device disposed on a surface of the light reflecting surface.

The back lighting apparatus of the side-light type having a light source on the lateral side can contribute to reduction of the overall weight and thickness of a liquid crystal display device. Therefore, recently, they are used as an illuminator for liquid crystal display devices in a laptop, a notebook, a personal computer, etc. Such portable electronic equipments as a notebook are driven by a built-in battery and thus require a low power consumption of the illuminating device of the side-light type. For example, in case of a notebook, the back lighting apparatus consumes 60% of power. In order to reduce the power consumption, it is desired to enhance light transmission efficiency of material for forming the light guide plate, the diffusion plate, the polarizing plate, etc by improving transparency and regularities of luminance of them.

Further, back lighting apparatus composes 60% of the overall thickness of liquid crystal display devices in portable equipments. Accordingly, it is desirable to lighten and thin the light guide plate for achieving compactness of the portable equipments.

FIG. 1 shows an example of the side-light type illuminating device. A liquid crystal panel 8 creates character or image information by controlling light transmittance on a desired position of a screen. The liquid crystal panel 8 is not light-emissive and supplied with light from the illuminating part. A cold cathode florescent tube that consumes relatively less power, is commonly used as a light source 1. A light guide plate 5 has a light emission surface and a sloped rear surface opposed thereto. Although the light guide plate 5 appears in a wedge shape in FIG. 1, it may be flat or any particular irregular shape. In addition to the light guide plate 5, various sheets having supplementary functions such as a reflective plate 3, diffusion plate 6, polarizing plate 7, etc., are stacked on the light guide plate 5.

In the general light guide plate, a light scattering pattern 4 is formed by dot-printing method with white ink on the rear surface of the light emission surface to improve light emitting efficiency as shown in FIG. 1. However, the process for forming the light scattering pattern 4 by the dot-printing method with white ink has defects as follows.

In the process for forming a light scattering pattern using white ink, the pattern is printed poorly as it becomes minute, so light reflection effect of the pattern is reduced. Further, the luminance of the print is damaged, for example, due to discoloration, as time goes by, and consequently, the lifetime of the illuminating device will be shortened.

In order to solve the above-described problems, a dot-printless light guide plate has been developed. For example, U.S. Pat. No. 6,123,431 discloses a dot-printless light guide plate having grooves thereon to form a light scattering pattern. Also, U.S. Pat. No. 5,881,201 discloses a dot-printless light guide plate in which organic or inorganic particles are dispersed, which have a different refractive index compared to the basic resin. Thus, the light guide plate has the light scattering function by variations in refractive index throughout the light guide and serves as a light diffusion plate as well. However, in order to form the light scattering pattern by means of molding in the process for preparing the dot-printless light guide plate, it is needed that the base resin should have a good melt flow index and heat resistance.

Japanese Patent Laid-Open Publication No. 10-265530 and U.S. Pat. No. 5,883,163 disclose a method for producing a light guide plate with an excellent formability using polymethylmethacrylate. However, since PMMA has a high melt viscosity and a low fluidity, it is difficult to mold a thin light guide plate in a large size. When the process temperature is raised to increase the fluidity, the resin foams in the cylinder, which may cause voids in the molded article. Further, PMMA has a relatively high specific gravity of 1.2. So, it can hardly satisfy the requirements of thinness and lightness for the light guide plate used in liquid crystal display devices of portable equipments. PMMA also tends to be deformed due to its high hygroscopicity and hence, a large-sized light guide plate is easily bended.

Meanwhile, polycarbonate (herein after referred to as PC) is suggested as an optical material, for example, as an optical disk in Japanese Patent Laid-Open Publication No. 9-183894 but it cannot be easily applied to the light guide plate. PC cannot provide a sufficient luminance as a back lighting since it has a high birefringence value. Further, though PC has a heat deformation temperature higher than that of PMMA, it requires an increased molding temperature to improve the fluidity for molding. However, under the condition of high molding temperature, PC is likely to be foamed or hydrolyzed by absorbing moisture. For this reason, it is difficult to produce a thin molded article in a large size and with a good mechanical strength through an injection molding. In addition, it is difficult to form a micro-pattern on the rear surface of the light guide plate with PC.

Japanese Patent Laid-Open Publication No. 9-296028 suggests a hydrogenated norbornene polymer as a novel optical material, which has a specific gravity lower than that of PMMA and a good heat resistance. However, this norbornene resin is produced by complex ring opening polymerization and hydrogen treatment. Also, there are several problems in forming a thin plate in a large-size for using as a light guide plate. Since the resin of the above invention has a high hygroscopicity of 0.24, bending may occur in the produced thin article. Further, the fluidity of the resin is poor due to its high molecular weight. Moreover, the resin may be yellowed by discoloration resulting from oxidation, which leads to deterioration of whiteness related to the luminance of the light guide plate.

SUMMARY OF THE INVENTION

A feature of the present invention is to apply an addition polymerized norbornene copolymer to produce a light guide plate.

In accordance with the feature of the present invention, there is provided a method for producing a dot-printless light guide plate for a liquid crystal display device using an addition polymerized norbornene copolymer represented by the following general formula (1):

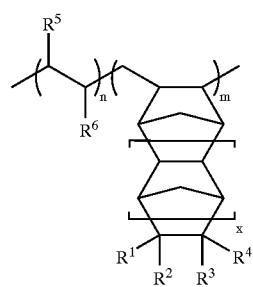

(1)

wherein $R^1$, $R^2$, $R^3$ and $R^4$ are respectively a hydrogen atom, a $C_1$~$C_{10}$ linear, branched or cyclic alkyl group, or —$COOR^7$ in which $R^7$ is a $C_1$~$C_{10}$ linear, branched or cyclic alkyl group; $R^5$ and $R^6$ are respectively a hydrogen atom or a $C_1$~$C_{10}$ linear, branched or cyclic alkyl group; and x is an integer of 0 to 4.

BRIEF DESCRIPTION OF THE DRAWINGS

The above and other features and advantages of the present invention will become more apparent after a reading of the following detailed description when taken in conjunction with the drawings, in which.

DETAILED DESCRIPTION OF THE INVENTION

Figure 1:
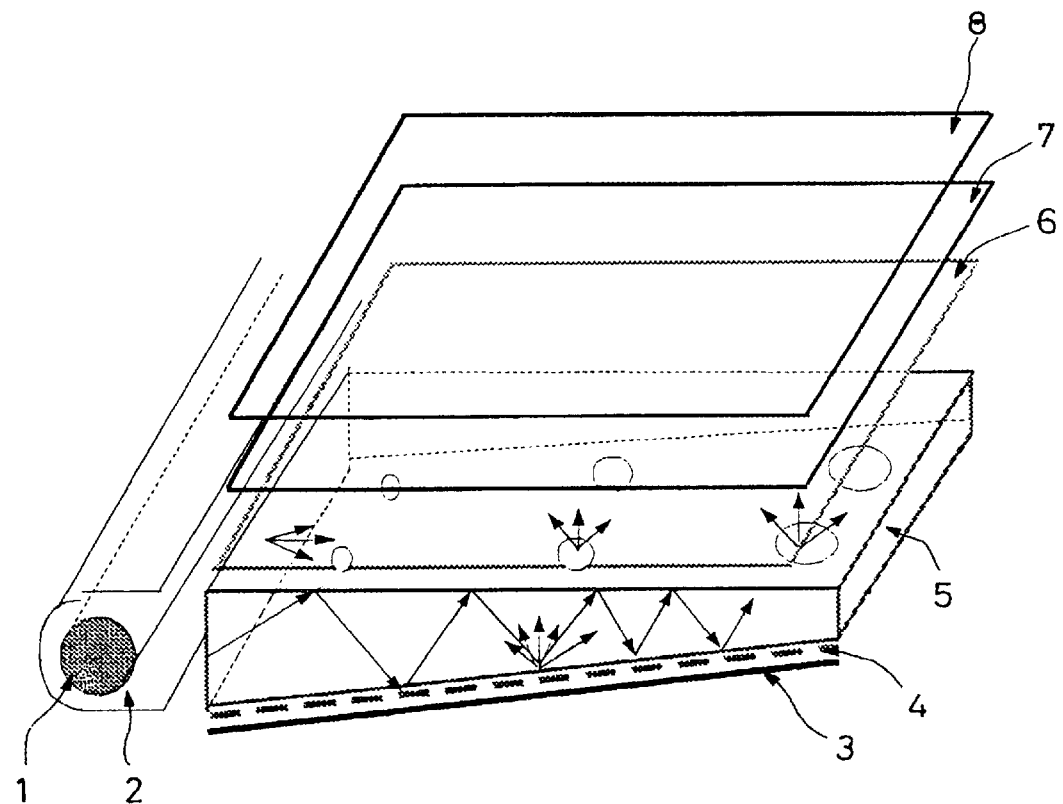
FIG. 1 is a schematic view illustrating a conventional side-light type light guide plate for a liquid crystal display device.

Now, the present invention will be described in detail.

In the method for producing a dot-printless light guide plate for liquid crystal display devices according to the present invention, used olefin-norbornene copolymer is an addition polymerization type resin represented by the following general formula (1):

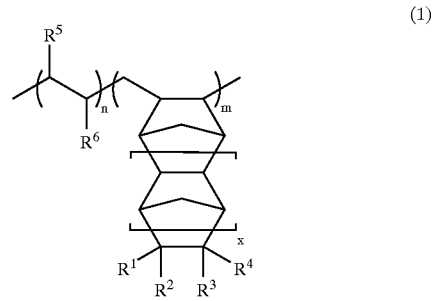

(1)

wherein $R^1$, $R^2$, $R^3$ and $R^4$ are respectively a hydrogen atom, a $C_1$~$C_{10}$ linear, branched or cyclic alkyl group, or —$COOR^7$ in which $R^7$ is a $C_1$~$C_{10}$ linear, branched or cyclic alkyl group; $R^5$ and $R^6$ are respectively a hydrogen atom or a $C_1$~$C_{10}$ linear, branched or cyclic alkyl group; and x is an integer of 0 to 4.

The addition polymerized olefin-norbornene copolymer is prepared using transition metal catalyst. Preferable transition metal catalyst system comprises IV group transition metal represented by the following general formula (2) as a main catalyst and aluminoxane as an auxiliary catalyst:

(2)

wherein M is titanium, zirconium or hafnium; Cp and Cp' are respectively cyclopentadienyl group, indenyl group, fluorenyl group or derivatives thereof which forms $\eta_5$ bonds with the transition metal of IV group; E and E' are respectively a halogen compound or an $C_1$~$C_7$ alkyl group; Y is a linear or branched alkyl group, or a silyl group.

Specific examples of the above metallocene catalyst are dimethylsilyltetramethylcyclopentadienylzirconium dichloride,
  dimethylsilylbis(tetramethylcyclopentadienyl)zirconium dimethyl,
  isopropylbis(tetramethylcyclopentadienyl)zirconium dichloride,
  dimethylsilylbis(indenyl)zirconium dichloride,
  dimethylsilylbis(indenyl)zirconium dimethyl,
  ethylenebis(indenyl)zirconium dichloride,
  ethylenebis(indenyl)zirconium dimethyl, ethylenebis(tetrahydroindenyl)zirconium dichloride,
isopropyl (cyclopentadienylfluorenyl) zirconium dichloride,
isopropyl(cyclopentadienylfluorenyl)zirconium dimethyl,
ethylenebis(tetramethylcyclopentadienyl)zirconium dichloride,
ethylenebis(tetramethylcyclopentadienyl)zirconium dimethyl,
ethylenebis(2-methylindenyl)zirconium dichloride,
ethylenebis(3-methylindenyl)zirconium dichloride,
ethylenebis(4,7-dimethylindenyl)zirconium dichloride,
ethylenebis(5,6-dimethylindenyl)zirconium dichloride,
ethylenebis(2,4,7-trimethylindenyl)zirconium dichloride,
dimethylsilylbis(2-methylindenyl)zirconium dichloride,
dimethylsilylbis(3-methylindenyl)zirconium dichloride,
dimethylsilylbis(4,7-dimethylindenyl)zirconium dichloride,
dimethylsilylbis(5,6-dimethylindenyl)zirconium dichloride,
dimethylsilylbis(2,4,7-trimethylindenyl)zirconium dichloride,
dimethylsilylbis(benzindenyl)zirconium dichloride,
dimethylsilylbis (2-methylbenzindenyl) zirconium dichloride, etc.

The olefin-based monomer which can be used in preparing the resin according to the present invention includes ethylene, propylene, 1-butene, 1-pentene, 1-hexene, 1-heptene, 1-octene, 1-nonene, 1-decene, 1-dodecene, etc. Preferably, ethylene is used.

The norbornene-based monomer which can be used in preparing the resin according to the present invention includes 2-norbornene, 5-methyl-2-norbornene, 5-ethyl-2-norbornene, 5-butyl-2-norbornene, 5-propyl-2-norbornene, 5-phenyl-2-norbornene, 5-hexyl-2-norbornene, 5-octyl-2-norbornene, 5-nonyl-2-norbornene, 5-decyl-2-norbornene, 5-pentyl-2-norbornene, etc. In addition, ester derivatives such as 5-methoxycarbonyl-2-norbornene, 5-ethoxycarbonyl-2-norbornene, 5-t-butoxycarbonyl-2-norbornene, 5,5'-methylmethoxycarbonyl-2-norbornene can be used.

For polymerization of the monomers, metallocene of VIII group nickel and palladium, as well as metallocene of IV group transition metal can be effectively used. Example of such metallocenes includes nickel compounds such as nickel bisacetylacetonate, nickel bisacetate, bis(allyl)nickel, allylnickel chloride; and palladium compounds such as palladium(II) acetate, palladium bisacetylacetate, dichloro-bis(acetonitrile)palladium, dichloro-bis(benzonitrile) palladium.

Along with the metallocenes, cocatalyst such as alkylaluminoxane, boronetetrafluoroantimonate, boronehexafluoroantimonate, is used.

The organic solvent which is used in the polymerization of the present invention includes an aromatic solvent such as benzene, toluene, xylene; a hydrocarbon-based solvent such as pentane, hexane, heptane, octane, cyclopentane, cyclohexane, methylcyclohexane, decane; a halogenated hydrocarbon solvent such as methyl chloride, methylene chloride, 1,2-dichloroethane, 1,1,1-trichloroethane, 1,1,2-tritrichloroethane, 1,1,2-trichloroethylene; a polar solvent such as nitromethane; and a mixtures thereof. When a metallocene catalyst is used, toluene, hexane, or heptane is preferred.

The polymerization of the present invention is conducted at a temperature in a range of −20° C. to 150° C., preferably in a range of 20° C. to 100° C.

The method for recovering the resulting copolymer is that the polymerized solution is poured into a large amount of non-solvent, i.e. alcohol, to precipitate the copolymer and then the precipitant is separated from the solution by filtering or centrifugation method.

Preferably, the resin comprises 15 to 99.5 wt % of a norbornene-based repeating unit and 0.5 to 85 wt % of an olefin-based repeating unit. When the content of the olefin-based repeating unit is less than 0.5 wt %, the glass transition temperature is increased, which leads to problems in conducting melt molding process. Also, when the content of the olefin-based repeating unit is more than 85 wt %, the glass transition temperature is lowered, which lead to poor heat resistance.

The resin has a number average molecular weight of 5,000 to 3,000,000 as measured by gel permeation chromatography at a temperature of 135° C. using 1,2,4-trichlorobenzene solution and preferably a melt index of 20 to 300 g/10 min as measured at a temperature of 280° C. under a load of 2.16 kgf according to JIS-K-6719. If the molecular weight of the resin is too low, sufficient stiffness cannot be attained. If the molecular weight of the resin is too high, melt viscosity is increased, which makes molding process difficult.

The resin of the present invention has a glass transition temperature of 50° C. to 250° C. The glass transition temperature of the copolymer relates to fusibility of the light guide plate. When it exceeds 250° C., stress is likely to remain within the light guide plate and birefringence is increased. When it is below 50° C. the final molded article has a poor heat resistance.

The copolymer of the present invention is processed by methods such as injection molding, extrusion molding, inflation formation, blow molding, injection-blow molding, press molding, rotational molding, cutting molding, vacuum molding, roller molding, calendaring, casting to produce the light guide plate.

Light Guide Plate

The light guide plate prepared according to the present invention has a wedge shape having a thickness decreasing with the distance from the light source, and incident angle 74 1 to the light emission surface of the light guide plate is less than the critical angle, which is a minimum incident angle where total reflection occurs. The thickness of the light guide plate at the light incident surface is 4 mm or less, preferably 0.3 to 3 mm, and at the surface opposite to the light incident surface is 4 mm or less, preferably 0.1 to 2 mm. The area ratio of the light incident surface to the light emission surface is from 1:5 to 1:500, preferably from 1:10 to 1:400, more preferably from 1:15 to 1:300.

Figure 2A:
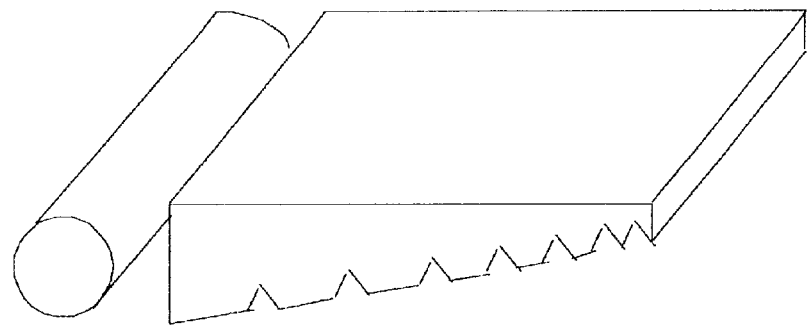
FIGS. 2a, 2b and 2c are schematic views illustrating a dot-printless light guide plate according to the present invention.
Figure 2B:
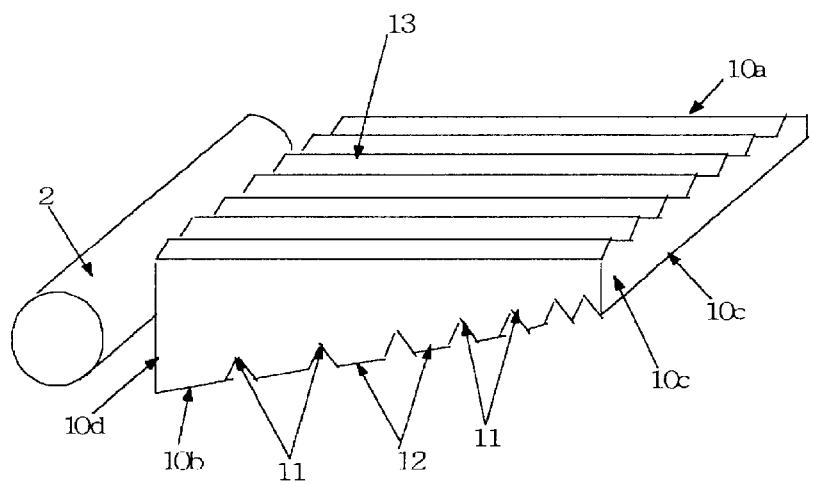
Figure 2C:
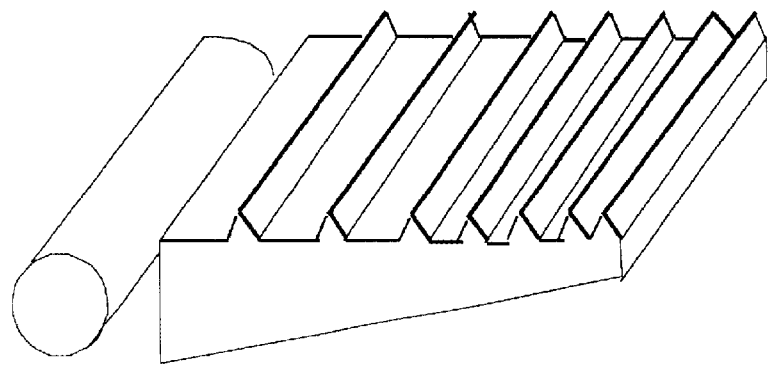

As shown in FIG. 2, the dot-printless light guide plate prepared according to the present invention has grooves in various shapes or geometrical configures such as V-shape, U-shape, O-shape, rhombus-shape, square-shape and the like. The pitch between the grooves is 5 to 5,000 μm, preferably 10 to 500 μm and the height is 5 to 5,000 μm, preferably 10 to 500 μm. Further, it is preferred that the pitch between the grooves at the side of the incident surface of the light guide plate is 0.5 to 50% less than that of the opposite surface.

Molding Method

The method which can be used to produce the light guide plate using ethylene-norbornene addition polymer includes injection molding, press molding, extrusion-blow molding, multiplayer blow molding, connection blow molding, double-wall molding, drawing blow molding, vacuum molding, rotational molding, etc. Melting moldings such as heat press molding, injection molding, particularly injection molding is preferred in terms of formability and productivity.

Now, the preparation of the light guide plate by the injection molding method will be explained.

Injection Molding

Figure 3:
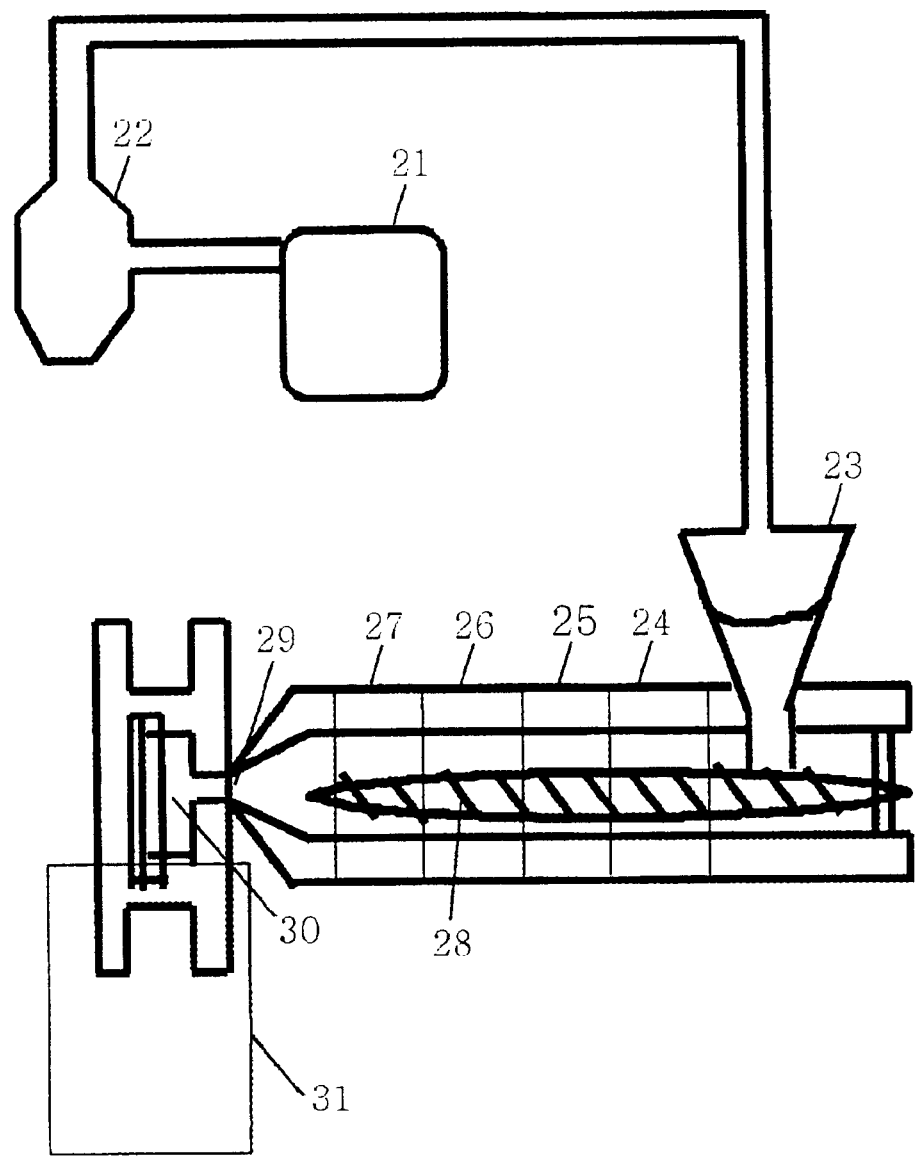
FIG. 3 is a schematic view illustrating an injection molding apparatus used in producing the light guide plate.

FIG. 3 shows an example of the screw type injection molder which is useful in producing the light guide plate according to the present invention. As shown in FIG. 3, the screw type injection molder comprises a reservoir 21, dryer 22, hopper 23, cylinders 24, 25, 26 and 27, screw 28 nozzle 29, mold 30, means for heating mold 31.

Introducing and Melting of Material for Molding

The molding materials is dried in the dryer 22 and supplied to the hopper to be purged with nitrogen. Then the molding material is injected to the mold 30 through the heating cylinders 24, 25, 26 and 27 at a constant pressure and time, and then the mold is cooled and separated from light guide plate.

In the process for drying the materials the temperature of the dryer is in the range of 50° C. to 150° C., preferably 80° C. to 120° C. The drying time is 10 minutes to 5 hours, preferably 20 minutes to 4 hours.

Also, the temperatures of the heating cylinders may be different each other, but preferably, in the range of 150° C. to 400° C., more preferably 180° C. to 360° C. Difference between the temperatures of the respective heating cylinders may be less than 80° C., preferably less than 50° C. The temperatures of the heating cylinders are controlled by jacket or thermal heaters. The type of the screw is suitably determined in order that the materials for molding can be uniformly mixed.

Injection

As shown in FIG. 3, the materials which have been melted while passing through the heating cylinders 24, 25, 26 and 27, are supplied toward the nozzle 29 at a constant rate. The melted materials deposited in the vicinity of the nozzle 29, is supplied into the mold 30 through the nozzle 29. If the injection rate is less than 1 cm$^2$/sec, the precision of the light guide becomes poor. If the injection rate exceeds 10,000 cm$^2$/sec, the temperatures of the materials for molding is raised suddenly causing silver streak on the light guide plate. Additional pressure(injection pressure) which is applied to the materials for molding by pushing the screw 28 toward the nozzle 29 varies according to the viscosity or fluidity of the materials, shape or thickness of the molded articles, or structure within the mold 30. Pressure for injection is applied in two steps: One is the step of injecting the molding materials into the mold 30 (hereinafter the pressure in this step is referred to as injection pressure) and the other is the step after finishing injection of the molding materials into the mold (hereinafter the pressure of this step is referred to as holding pressure). The injection pressure is gradually increased during the mold is filled with the molding materials and rapidly increased or decreased upon completion of the filling of the molding materials, resulting in a peak pressure. After this, the holding pressure is applied to the mold.

The holding pressure is the pressure applied to the mold for a period of time until a gate part of the mold is completely cooled and solidified after the mold is filled up by the molding materials. It is 1 kg/cm$^2$ or more, preferably 10 kg/cm$^2$ or more. By using the pressure within this range, molding contraction percentage can be reduced and the size of the produced light guide plate may be improved in precision. The upper limit of the holding pressure is 20,000 kg/cm$^2$, preferably up to 15,000 kg/cm$^2$. Also, the upper limit of the holding pressure is preferably determined within the range of the closing pressure of the mold. If the holding pressure exceeds the closing pressure of the mold, the mold can be opened during the cooling process. The time for maintaining the above holding pressure is preferably 1 to 300 seconds.

According to the present invention, the peak pressure may be 99.9 to 0.1%, preferably 99 to 1% of the holding pressure. By setting the range as above, it is possible to prevent filling failure of the mold 30 and increase the density of the light guide plate, thereby reducing the molding contraction percentage. Ultimately, a light guide plate with high precision can be obtained.

In addition, it is preferable to provide an outline of gate from the center of the light guide plate to the side of the light emission surface. In order to improve the fluidity of the materials and prevent flow marks or contraction, the gate has enRP more than 50% of the thickness at the wedged side, where the gate is provided, and area ratio relative to the side area of the wedged side where the gate is 1:2 to 1:15.

Cooling and Solidification of the Molding Materials

The molding materials filled in the mold 30 is maintained within the mold 30 for a constant time to be cooled and solidified. At this moment, the temperature of the mold is between 10° C. and 220° C., preferably between 50° C. and 180° C. If the temperature of the mold is too low, the fluidity of the resin becomes poor, which may cause molding defects. In order to improve the fluidity of the molding materials, it is preferable to increase the temperature of the mold. However, when the temperature exceeds Tg of the molding materials, the light guide may not be released readily from the mold and the surface precision of the light guide plate may be deteriorated.

Also, the closing pressure of the mold is 10 to 20,000 kg f/cm$^2$, preferably, 50 to 15,000 kgf/cm$^2$. By setting the closing pressure as above, it is possible to eliminate the risk that the mold is opened by the pressure applied to the mold during the step for filling the mold with molding material and also improve the molding efficiency.

The present invention is described in more detail below by way of examples. These examples are for illustration of the present invention but are not intended to limit the scope of the present invention.

In the Producing Example, Examples and Comparative Examples, various physical properties are measured as follows:

(1) Index of refraction is measured at a temperature of 25° C. according to ASTM-D542.

(2) Glass transition temperature is measured according to JIS-K712.

(3) Melt index is measured at a temperature of 280° C. under a load of 2.16 kgf according to JIS-K6719. The hole diameter of the die is set to 2.095+/−0.03 mm and the traveling distance of the piston is set to 25.0+/−0.25 mm.

(4) 50% breaking energy in a falling ball impact test is measured according to JIS-K7211. More particularly, a flat plate having a thickness of 3 mm is formed by the injection molding method and subjected to the measurement in an atmosphere of relative humidity of 30% at a temperature of 23° C. using a missile shaped weight with a radius of ¾ inch.

(5) Measurement of Transparency is carried out by measuring light transmittance by a spectrometer(model U-30 produced by Nippon spectrum corporation, Japan) while continuously varying the wavelength in a range of 400 to 900 nm. The minimum light transmittance is determined as the light transmittance of the light guide plate. The higher the light transmittance is, the better the transparency is.

(6) Appearance formability is evaluated by examining the light guide plate with the naked eyes to determine whether bubbles or voids exist in the plate following the below criteria:

⊚: There is no defect and formability of the scattering grooves is good
○: There exist minor defects and formability of the scattering grooves is poor
Δ: Some bubbles or voids are observed
X: Many bubbles or voids are observed (7) Measurement of luminance is carried out by measuring the brightness of the three points equally apart from each other on the light emission surface at the thicker part and thinner part of the light guide plate using a luminance meter (BM-7, Topcon Co., Ltd.). The luminance ratio (%) is calculated by dividing the minimum value by the maximum value and multiplying 100 and evaluated by the following criteria:

⊚: more than 88%
○: 85% or more, less than 88%
Δ: 82% or more, less than 85%
X: less than 82[{]ps (8) Heat resistance is determined by measuring size variation of the light guide plate in an oven at 100° C. for 24 hours and evaluated by the following criteria:

⊚: size variation is 0.1% or less
○: size variation is greater than 0.1% but no more than 0.3%
Δ: size variation is greater than 0.3% but no more than 1.0%
X: size variation is greater than 1.0[{]ps (9) Mechanical strength is evaluated by impact resistance according to the falling ball test. Upon a same position of 10 light guide plates, a missile shaped weight (10 g) with a radius of ¾ inch is freely dropped from a height of 50 cm. Whether any breakage or crack occurs in the light guide plate is examined and the mechanical strength was evaluated by the following criteria:

⊚: none of the light guide plates show breakage or cracking
○: 1 to 3 of 10 light guide plates show(s) breakage or cracking
Δ: 4 to 6 of 10 light guide plates show breakage or cracking
X: 7 or more of 10 light guide plates show breakage or cracking

PRODUCING EXAMPLE 1

Copolymerization of ethylene and norbornene was carried out by a 2L autoclave reactor equipped with an external temperature controller, mechanical stirring device and a valve for supplying monomers and nitrogen gas. After removing moisture in reactor through refluxing nitrogen, 1 L of toluene, and 0.3 mole of purified norbornene was introduced to the reactor, and then 1 mmole of triethyl aluminium and 3.0 mmole of aluminoxane as a co-catalyst for saturating ethylene were added to the reactor. Then, 0.002 mmole of ethylene bisindenylzirconium dichloride was added and the reactor was subjected to the polymerization under the ethylene pressure of 150 psig for 1 hour. A small amount of methanol(200 mole) was added to the reactor to complete the polymerization. A large amount of methanol was added to precipitate the produced polymer. The polymers were separated from the solution by filtering, washed with methanol and vacuum dried. Results of this polymerization are shown in Table 1 below.

PRODUCING EXAMPLE 2

A resin was prepared following the same procedures as Producing Example 1, except that dimethylsilyl bisindenylzirconium dichloride was used as the catalyst. Results of this polymerization are shown in Table 1 below.

TABLE 1

|  | Norbornene content (wt %) | Yield (g) | Activity (kg/mol.Zr.h) | Mn | Tg |
| --- | --- | --- | --- | --- | --- |
| Resin 1 (Producing Example 1) | 28.2 | 82 | 41000 | 250000 | 95 |
| Resin 2 (Producing Example 2) | 28.2 | 93 | 46500 | 320000 | 102 |

PRODUCING EXAMPLE 3

Resins were prepared following the same procedures as Producing Example 2, except that the added amount of norbornene was different as shown in Table 2. Results of this polymerization are shown in Table 2 below.

TABLE 2

|  | Norbornene content (wt %) | Yield (g) | Activity (kg/mol.Zr.h) | Mn | Tg |
| --- | --- | --- | --- | --- | --- |
| Resin 3 | 9.4 | 125 | 62500 | 345000 | 25 |
| Resin 4 | 18.8 | 108 | 54000 | 304000 | 59 |
| Resin 5 | 28.2 | 82 | 41000 | 250000 | 95 |
| Resin 6 | 47.1 | 61 | 30500 | 220000 | 104 |
| Resin 7 | 75.3 | 28 | 24000 | 198000 | 135 |

EXAMPLES 1 to 5

100weight parts of respective addition polymers of ethylene and norbornene obtained from Producing Example 1 to 3 were mixed with 0.2 weight parts of pentaerythritol tetrakis(3-(3,5-t-butyl-4-hydroxyphenyl)propyonate as an antiaging agent and 0.2 weight parts of 2,2,6,6-tetramethyl-4-pyperizylbenzoate as a light stabilizer, kneaded in a biaxial kneader and stand-cut to gain pellet-shaped resin The refraction index of the resin was 1.52. These pellets were injection-molded to prepare a light guide plate. The injection molder was IS450 produced by Toshiba and the mold had a configuration so as to prepare a light guide plate as shown in FIG. 2a. Conditions for injection was controlled as the mold temperature to be 80° C., mean temperatures of the heating cylinders 4, 5, 6 and 7 to be 320° C., the nozzle temperature to be 270° C., injection pressure to be 2,000 kg/cm², the holding pressure to be 500 kgf/cm², the closing pressure to be 1300 kgf/cm², the injection rate to be 30 cm²/sec, screw back pressure to be 80 kgf/cm², and the screw rotating speed to be 40 rpm. From the beginning of filling to end of filling it takes 2 seconds. Filling of the mold took 2 second from the beginning to the end.

The produced light guide plate has a thickness of 2.0 mm at the side of the light incident surface and a thickness of 0.3 mm at the side of the rear surface opposite to the light incident surface, and a total length of 16.2 inch. The plate has a wedge shape in which the thickness is gradually reduced from the incident surface toward the rear surface opposite to the incident surface and the grooves are formed more densely in the opposite side of the incident surface. A gate is disposed on the light emission surface from the center of the light emission surface toward the boundary with the light incident surface. The length of gate is 65 mm and the thickness of it is 1.8 mm.

Reflection tape (RF188, Sjimoto Electric Mechanic Co.) was attached to surfaces of the light guide plate except for the light emission surface. A cold cathode tube lamp (Harrison electric mechanic company) having a diameter of 2.4 mm was provided according to the light incident surface of the light guide plate. The surroundings of the lamp and the light guide plate were coated with reflector(GR38W, Kimoto Co.). A light diffusion sheet (PCMSA, Sjimoto Electric Mechanic Co.) was attached to the light emission surface and reflection sheet (RF188, Sjimoto Electric Mechanic Co.) was attached to the opposite surface to the light emission surface to form an edge light type plane light source unit. The light transmittance, luminance, heat resistance, etc was measured using this unit band the results are shown in Table 3.

TABLE 3

| Resin | Ex. 1 Resin 1 | Ex. 2 Resin 2 | Ex. 3 Resin 5 | Ex. 4 Resin 6 | Ex. 5 Resin 7 |
|---|---|---|---|---|---|
| MFR (g/10 min) | 60 | 70 | 180 | 60 | 200 |
| Breaking energy | 0.72 | 0.52 | 0.41 | 0.20 | 0.15 |
| Norbornene content (wt %) | 47 | 52 | 60 | 51 | 55 |
| Tg | 95 | 102 | 95 | 104 | 135 |
| Light transmittance | 92 | 92 | 92 | 92 | 92 |
| Luminance ratio | Δ | Δ | Δ | ○ | ◎ |
| Appearance formability | Δ | Δ | Δ | ◎ | ◎ |
| Heat resistance | Δ | Δ | Δ | ○ | ◎ |
| Mechanical strength | ○ | ○ | ○ | ○ | ◎ |

By using the addition polymerized olefin-norbornene copolymer according to the present invention in preparing the light guide plate, it is possible to provide the light guide plate having a good light transmittance over the wavelengths between 400 nm and 800 nm, and lighter as compared to those made of PMMA resin. Also, the light guide plate is free from the yellowing phenomena since there is no double bond in the polymer molecule, and is well coated with coating composition made of cesium compounds or silicon compounds. In addition, the fluidity of the molding materials can be controlled by changing the content of ethylene and norbornene, whereby micro-pattern formability of the dot-printless light guide plate can be improved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed:

1. A method for producing a dot-printless light guide plate for a liquid crystal display device using an addition polymerized norbornene copolymer represented by the following general formula (1):

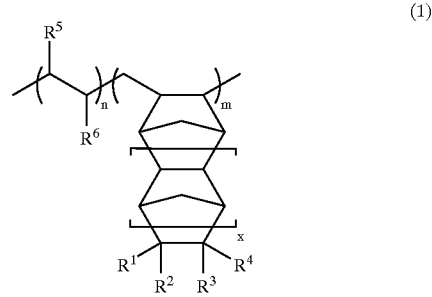

wherein $R^1$, $R^2$, $R^3$ and $R^4$ are respectively a hydrogen atom, a $C_1$~$C_{10}$ linear, branched or cyclic alkyl group, or —COOR$^7$ in which $R^7$ is a $C_1$~$C_{10}$ linear, branched or cyclic alkyl group; $R^5$ and $R^6$ are respectively a hydrogen atom, a $C_1$~$C_{10}$ linear, branched or cyclic alkyl group; and x is an integer of 0 to 4 wherein the light guide plate is prepared by injection molding and wherein the injection molding method comprises the steps of injecting melted copolymers into a mold having a surface temperature of 50 to 200° C. at a rate of 1 to 10,000 cm$^3$/sec, holding the mold for 1 to 300 seconds at a pressure of 1 to 20,000 kg/cm$^3$ to generate a molded article, and cooling the molded article to solidify it.

2. The method according to claim 1, wherein the copolymer comprises 15 to 99.5 wt % of a norbornene-based repeating unit and 0.5 to 85 wt % of an olefin-based repeating unit.

3. The method according to claim 1, wherein the copolymer has an average molecular weight of 5,000 to 3,000,000.

4. The method according to claim 1, wherein the copolymer has a melt index of 20 to 300 g/10 min as measured at a temperature of 280° C. and under a load of 2.16 kgf according to JIS-K-6719.

5. The method according to claim 1, wherein the copolymer has a glass transition temperature of 50° C. to 250° C.

6. The method according to claim 1, wherein the copolymer is subjected to a drying process at a temperature of 50 to 150° C. for 10 minutes to 5 hours before it is melted.

7. The method according to claim 1, wherein a closing pressure of the mold is 10 to 20,000 kg/cm$^3$.

* * * * *